United States Patent
Su et al.

(10) Patent No.: US 8,654,058 B2
(45) Date of Patent: Feb. 18, 2014

(54) APPARATUS AND METHOD FOR ENHANCING IMAGE CONTRAST

(75) Inventors: Jimmy Su, Taoyuan Hsien (TW); Yu-Min Hsiao, Taoyuan Hsien (TW); Shiau-Bin Huang, Taoyuan Hsien (TW)

(73) Assignee: Delta Electronics Inc., Guei-Shan, Hsiang (TW)

( * ) Notice: Subject to any disclaimer, the term of this patent is extended or adjusted under 35 U.S.C. 154(b) by 1166 days.

(21) Appl. No.: 11/270,085

(22) Filed: Nov. 9, 2005

(65) Prior Publication Data

US 2007/0046829 A1 Mar. 1, 2007

(30) Foreign Application Priority Data

Aug. 30, 2005 (TW) ................................ 94129670 A

(51) Int. Cl.
*G09G 3/34* (2006.01)
*H04N 5/52* (2006.01)

(52) U.S. Cl.
USPC ........................................ 345/102; 345/690

(58) Field of Classification Search
USPC ........................................... 345/690; 399/49
See application file for complete search history.

(56) References Cited

U.S. PATENT DOCUMENTS

| | | | | |
|---|---|---|---|---|
| 7,742,032 | B2* | 6/2010 | Diefenbaugh et al. | 345/102 |
| 2001/0052947 | A1* | 12/2001 | Taniai et al. | 348/760 |
| 2004/0001076 | A1* | 1/2004 | Leng et al. | 345/690 |
| 2004/0021651 | A1* | 2/2004 | Takeuchi | 345/204 |
| 2004/0223007 | A1 | 11/2004 | Mamata | |
| 2005/0057487 | A1 | 3/2005 | Takata et al. | |
| 2005/0134711 | A1* | 6/2005 | Hori | 348/254 |
| 2005/0140639 | A1* | 6/2005 | Oh et al. | 345/102 |
| 2006/0001641 | A1* | 1/2006 | Degwekar et al. | 345/102 |
| 2006/0002726 | A1* | 1/2006 | Fukui | 399/49 |

FOREIGN PATENT DOCUMENTS

| | | |
|---|---|---|
| CN | 1467700 A | 1/2004 |
| JP | 06-095069 | 4/1994 |
| JP | 11-045078 | 2/1999 |
| JP | 2004-279503 | 10/2004 |
| JP | 2005-86721 | 3/2005 |
| JP | 2005-196108 | 7/2005 |

OTHER PUBLICATIONS

IBM C400 Projector User's Guide, Jul. 2004, Chapters 1 and 5, URL, http://www.projectorcentral.com/pdf/projector_manual_2572.pdf (16 pgs.).

* cited by examiner

*Primary Examiner* — Amare Mengistu
*Assistant Examiner* — Joseph G Rodriguez
(74) *Attorney, Agent, or Firm* — Patterson, Thuente, Pedersen, P.A.

(57) ABSTRACT

An apparatus for enhancing image contrast includes a microprocessor which presets a plurality of thresholds, such as a black threshold and a white threshold. When determining the brightness of an image is lower than the black threshold, the micro-processor decreases the illumination level of a light source. When determining the brightness of an image is higher than the white threshold, the micro-processor increases the illumination level of the light source. A method for enhancing image contrast includes the steps of receiving an image data; determining whether the brightness of an image is lower than the black threshold; if yes, decreasing the illumination level of the light source; determining whether the brightness of the image is higher than the white threshold; and if yes, increasing the illumination level of the light source.

13 Claims, 5 Drawing Sheets

PC image characteristic curve

MAC image characteristic curve

VIDEO image characteristic curve

CHART image characteristic curve

B&W image characteristic curve

APPARATUS AND METHOD FOR ENHANCING IMAGE CONTRAST

CROSS-REFERENCES TO RELATED APPLICATIONS

This application claims priority to Taiwan Patent Application No. 094129670 filed on Aug. 30, 2005.

BACKGROUND OF THE INVENTION

1. Field of the Invention

The present invention relates to an apparatus and a method for enhancing image contrast; more particularly, it relates to an apparatus and a method for enhancing image contrast by adjusting an illumination level of a light source according to a plurality of thresholds.

2. Descriptions of Related Art

Since display apparatuses are in great demand today, providers are constantly trying to improve the qualities of the display apparatuses to earn more market share, wherein image contrast is one of the quality factors in need of improvement. A display apparatus with a higher contrast has the capability to display images in a better quality. This means that the display apparatus with higher contrast displays images in a wider range of brightness. Therefore, improvement of the level of contrast is an important consideration when trying to advance display apparatuses.

Both U.S. Pat. Nos. 6,831,722 and 6,867,834 provide a method for increasing contrast. As disclosed in the specifications, both of them require several optical materials and modules to match the polarity of output lights in order to achieve the objects of brightness adjustment and contrast enhancement. In addition to the requirements of complex optical and manufacturing techniques, the methods are limited to LCDs, and cannot be applied to the display systems of digital light processing (DLP).

U.S. Pat. No. 6,683,657 discloses an optical modulator that changes brightness and increases contrast. The optical modulator includes an ultrasonic motor placed between a lighting module and an optical module. This kind of structure increases the cost and complexity of projection devices. Moreover, U.S. Pat. No. 5,467,146 also discloses an optical modulator to change brightness and to increase contrast. The latter patent further needs an optical shutter to achieve the object of contrast enhancement. Similarly, the cost and complexity of projection devices will increase consequently.

U.S. Pat. No. 6,873,742 also provides a signal processing technique to increase brightness of a comparatively bright part and decrease brightness of a comparatively dark part by processing a brightness value of a digital image data based on an algorithm. Contrast is hence enhanced. However, the original information in the digital image data is distorted due to the signal processing.

In conclusion, the apparatuses or the methods of the prior art for enhancing contrast of images result in either an increase in cost and manufacturing complexity or the distortion of images. Therefore, an economical solution for enhancing contrast of display apparatuses is still desired.

SUMMARY OF THE INVENTION

An object of the present invention is to provide an apparatus for enhancing image contrast. The apparatus comprises a light source, an image data buffer, and a micro-processor. The image data buffer is configured to temporarily store an image data comprising a brightness of an image. The micro-processor presets a plurality of thresholds, including a black threshold and a white threshold. The micro-processor decreases an illumination level of the light source when the micro-processor determines that the brightness of the image is lower than the black threshold. The micro-processor increases the illumination level of the light source when the micro-processor determines the brightness of the image is higher than the white threshold.

The light source comprises a plurality of lighting modes such as an eco mode, a normal mode, and a boost mode. The micro-processor adjusts the light source to the eco mode when the micro-processor determines the brightness of the image is lower than the black threshold and when the light source is in one of the normal mode and the boost mode. The micro-processor adjusts the light source to the boost mode when the micro-processor determines the brightness of the image is higher than the white threshold and when the light source is in one of the eco mode and the normal mode. Contrast enhancement is hence achieved.

Another object of the present invention is to provide a method for enhancing a contrast of an image. The contrast is determined by a light source. The method comprises the steps of: (a) receiving an image data, wherein the image data comprises a brightness of the image; (b) determining whether the brightness of the image is lower than a black threshold, if yes, going to step (c); (c) decreasing an illumination level of the light source; (d) determining whether the brightness of the image is higher than a white threshold, if yes, going to step (e); and (e) increasing the illumination level of the light source.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
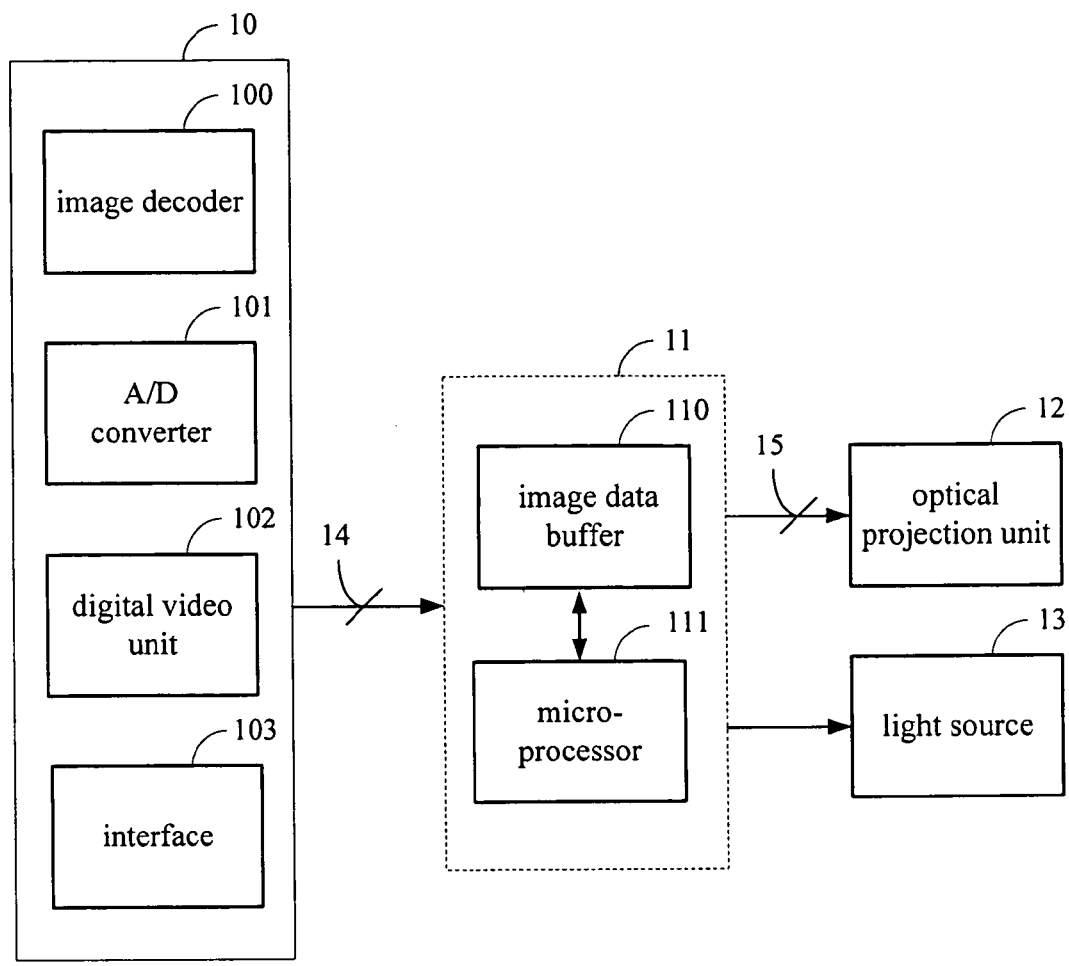
FIG. 1 illustrates a first embodiment of the present invention.

A first embodiment of the present invention shown in FIG. 1 is a projection device capable of enhancing image contrast. The first embodiment comprises a front-end processing circuit 10, an image detection modulation unit 11, an optical projection unit 12, and a light source 13. The front-end processing circuit 10 is used to receive image signals with different kinds of formats. It comprises an image decoder 100, an A/D converter 101, a digital video unit 102, and an interface 103. The image decoder 100 is used to receive an AV signal, an S-Video terminal signal, and a YCbCr signal. The A/D converter 101 is used to receive an RGB signal, an HDTV signal, and a YPbPr signal. The digital video unit 102 is used to receive a DVI signal and an HDMI signal. The interface 103 is used to receive image signals and control signals from all kinds of standard transmission interfaces, such as IEEE 1394, USB, Ethernet, wireless network, infrared, and RS-232. The front-end processing circuit 10 selects one of the aforementioned image signals to generate an image data after processing. The image data comprises a brightness of an image for display and is included in an image signal 14.

The image detection modulation unit 11 may be a PW166, a PW388, or a PW463 chip produced by Pixelworks or a DDP2000 or a DDP3020 chip produced by TI. Taking a PW166 chip as an example, it comprises an image data buffer 110 and a micro-processor 111. The image data buffer 110 is used to temporarily store the image signal 14, and the micro-processor presets a plurality of thresholds, such as a black threshold and a white threshold. Before the image carried by the image signal 14 is projected, the micro-processor 111 determines whether the brightness of the image is lower than the black threshold or is higher than the white threshold, wherein the brightness of the image refers to the mean brightness of the image. The micro-processor 111 decreases the illumination level by reducing the power supplied to the light 13 if the brightness of the image is lower than the black threshold. The micro-processor 111 increases the illumination level by enlarging the power supplied to the light 13 if the brightness of the image is higher than the white threshold. When the image detection modulation unit 11 transmits an image data 15 which generates from the image signal 14 to the optical projection unit 12, the optical projection unit 12 converts the image data 15 to the image, and the light source 13 projects the image onto a screen with a proper illumination level. Contrast enhancement is hence achieved.

In the first embodiment, the black threshold and the white threshold are predetermined values. For example, if the gray level of brightness is from 0 to 31, then the black threshold may be set at 5, and the white threshold may be set at 26. The light source 13 decreases the illumination level when the brightness of the image is lower than gray level 5. The light source 13 increases the illumination level when the brightness of the image is higher than gray level 26. The illumination level of the light source 13 keeps normal when the brightness of the image is between gray level 5 and 26.

More specifically, the light source 13 presets a plurality of lighting modes, such as an eco mode, a normal mode, and a boost mode. The micro-processor 111 adjusts the light source 13 to the eco mode when determining the brightness of the image is lower than the black threshold and the light source 13 is in one of the normal mode and the boost mode. However, when the micro-processor 111 determines the brightness of the image is lower than the black threshold but the light source 13 is already in the eco mode, the light source 13 keeps in the eco mode because the illumination level of the light source 13 cannot be decreased anymore. The micro-processor 111 adjusts the light source 13 to the boost mode when determining the brightness of the image is higher than the white threshold and the light source 13 is in one of the eco mode and the normal mode. However, when the micro-processor 111 determines the brightness of the image is higher than the white threshold but the light source 13 is already in the boost mode, the light source 13 keeps in the boost mode because the illumination level of the light source 13 cannot be increased anymore.

The light source 13 is adjusted from the normal mode or the boost mode to the eco mode by N stages, wherein N is a positive integer. For example, if N is set at 8, then the light source 13 gradually decreases the illumination level by 8 stages when the light source 13 is adjusted from the normal mode or the boost mode to the eco mode. Such design in which the illumination level is gradually decreasing prevents eyes discomfort due to sudden illumination difference. Similarly, the light source 13 is adjusted from the eco mode or the normal mode to the boost mode by N stages.

Figure 2:
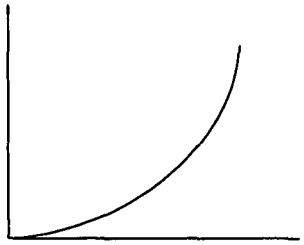
FIG. 2 illustrates image characteristic curves of the present invention.
Figure 2:
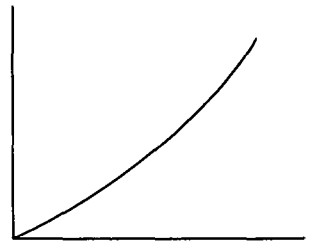
Figure 2:
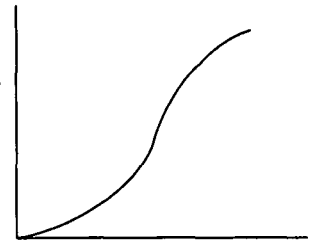
Figure 2:
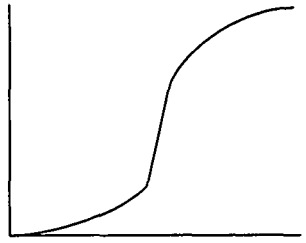
Figure 2:
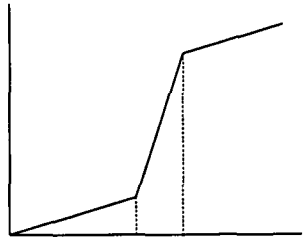

In the first embodiment, one of a plurality of image characteristic curves may be selected to adjust an illumination characteristic curve of the light source 13 for the eco mode, the normal mode, and the boost mode. FIG. 2 shows the image characteristic curves comprising a PC image characteristic curve, a MAC image characteristic curve, a VIDEO image characteristic curve, a CHART image characteristic curve, and a B&W image characteristic curve. The gamma value of the PC image characteristic curve is about 2.2, the gamma value of the MAC image characteristic curve is about 1.8, the gamma value of the VIDEO image characteristic curve is about 2.4, the gamma value of the CHART image characteristic curve is about 2.2, and the gamma value of the B&W image characteristic curve is about 2.4.

Figure 3:
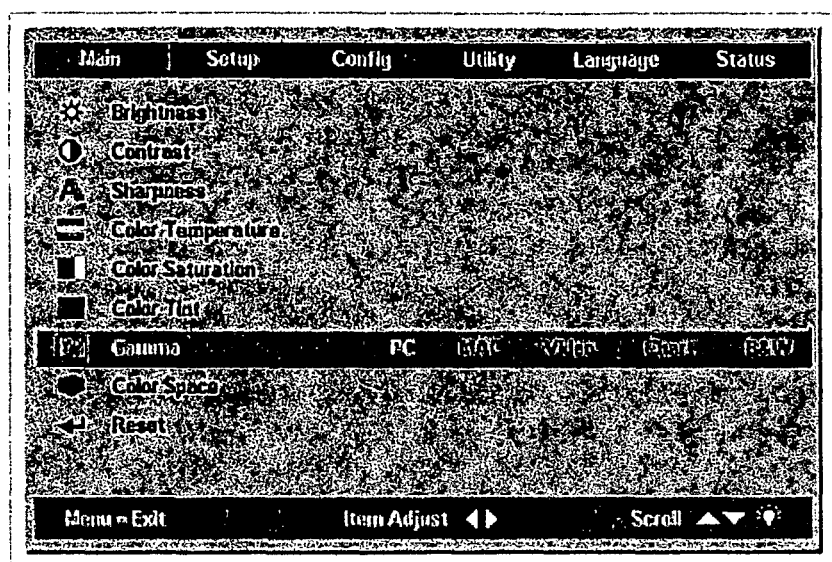
FIG. 3 illustrates the use of an OSD menu to select an image characteristic curve.

Taking the PC image characteristic curve as an example, the brightness of an output image, a projected image, does not change much when the brightness of an input image is low, but the brightness of the output image changes immensely when the brightness of the input image is high. Taking the B&W image characteristic as another example, the brightness of an output image slightly changes when the brightness of an input image is lower than A, and the brightness of the output image also changes slightly when the brightness of the input image is higher than B. As FIG. 3 shows, users may manually select one of the plurality of image characteristic curves through an OSD menu. The micro-processor 111 reinforces the adjustment for the illumination level of the light source 13 in the eco mode, the normal mode, and the boost mode according to the image characteristic curve selected by users.

Table 1 shows image contrast data of a known apparatus (DP2601 projector manufactured by Delta Electronics Inc.). The PC image characteristic curve and the B&W image characteristic curve are used for illustration, wherein the unit of brightness is lumen. As Table 1 shows, when the PC image characteristic curve is selected, the contrast of the eco mode is $$\frac{718.9}{0.4}:\frac{0.4}{0.4} = 1797.3:1,$$

the contrast of the normal mode is $$\frac{892.6}{0.5}:\frac{0.5}{0.5} = 1785.2:1,$$

and the contrast of the boost mode is $$\frac{966.9}{0.6}:\frac{0.6}{0.6} = 1611.5:1.$$

When the B&W image characteristic curve is selected, the contrast of the eco mode is 1977.8:1, the contrast of the normal mode is 1963.6:1, and the contrast of the boost mode is 1768.3:1. If the present invention is applied to the same apparatus, the micro-processor 111 adjusts the lighting mode automatically, i.e., the micro-processor 111 adjusts the lighting mode to the boost mode when a high brightness is needed and to the eco mode when a low brightness is needed. There fore, when the PC image characteristic curve is selected, the contrast provided by the present invention is up to $$\frac{966.9}{0.4} : \frac{0.4}{0.4} = 2417.3:1.$$

When the B&W image characteristic curve is selected, the contrast provided by the present invention is up to $$\frac{1061}{0.4} : \frac{0.4}{0.4} = 2652.5:1.$$

In other words, the present invention greatly enhances the contrast of the image without implanting any additional optical units. Furthermore, because the image signal 14 is not processed by unnecessary steps, image distortion is also avoided.

TABLE 1

| Brightness | PC | | B&W | |
| --- | --- | --- | --- | --- |
| | Brightest | Darkest | Brightest | Darkest |
| Eco Mode | 718.9 | 0.4 | 791.1 | 0.4 |
| Normal Mode | 892.6 | 0.5 | 981.8 | 0.5 |
| Boost Mode | 966.9 | 0.6 | 1061 | 0.6 |

Although the thresholds of the first embodiment merely comprises a black threshold and a while threshold, the present invention is not limited to these. For example, the thresholds may further comprise a medium threshold or even other thresholds. Similarly, the lighting modes are also not limited the eco mode, normal mode, and boost mode. In fact, the more lighting modes that are accompanying a proper number of thresholds, the better the contrast of images. Those skilled in the art may easily conceive applications with more thresholds and lighting modes in accordance with the description of the first embodiment. Although the first embodiment uses a projection device for illustration, those skilled in the art may easily apply the present invention to other display apparatuses, such as flat panel displays. In such a case, the optical projection unit 12 is replaced by a pixel driving circuit, and the light source 13 is a light emitting diode (LED) or a back light.

Figure 4:
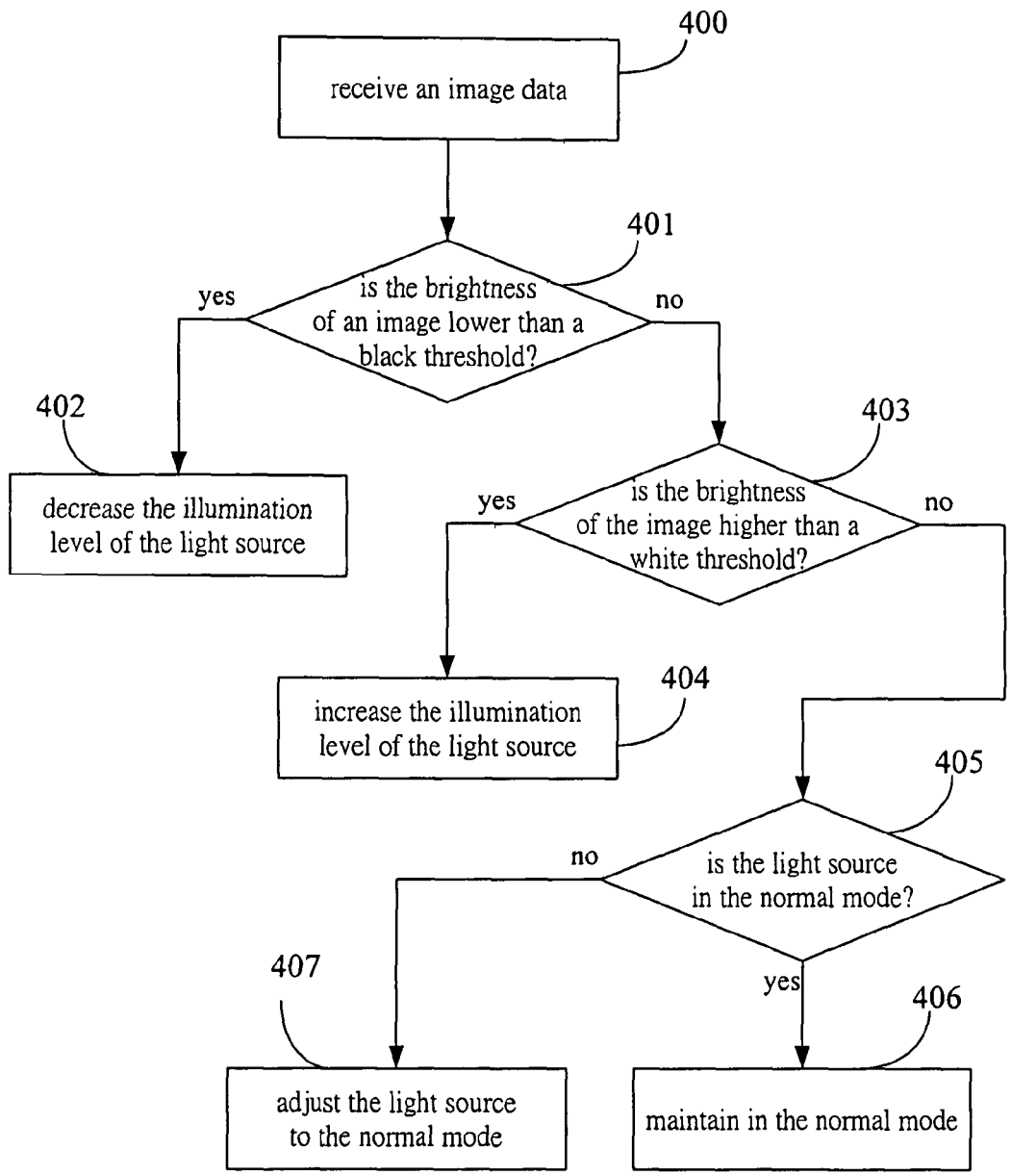
FIG. 4 is a flow chart showing a second embodiment of the present invention.

A second embodiment of the present invention is a method for enhancing a contrast of an image. The contrast of the image is determined by a light source. As described in the first embodiment, the light source comprises an eco mode, a normal mode, and a boost mode. The second embodiment comprises the following steps as shown in FIG. 4. In step 400, an image data is received and temporarily stored in an image data buffer. The image data comprises a brightness of an image. In step 401, determining whether the brightness of the image is lower than a black threshold according to the image data is executed. If yes, it means that the image needs a particularly low brightness so step 402 is executed to decrease the illumination level of the light source. If not, step 403 is executed to determine whether the brightness of the image is higher than a white threshold according to the image data. If yes, it means the image needs a particularly high brightness so step 404 is executed to increase the illumination level of the light source. If not, it means the image does not need a particularly low or a particularly high brightness so step 405 is executed to determine whether the light source is in the normal mode. If yes, step 406 is executed in which the light source maintains in the normal mode. If not, step 407 is executed to adjust the light source to the normal mode.

Figure 5:
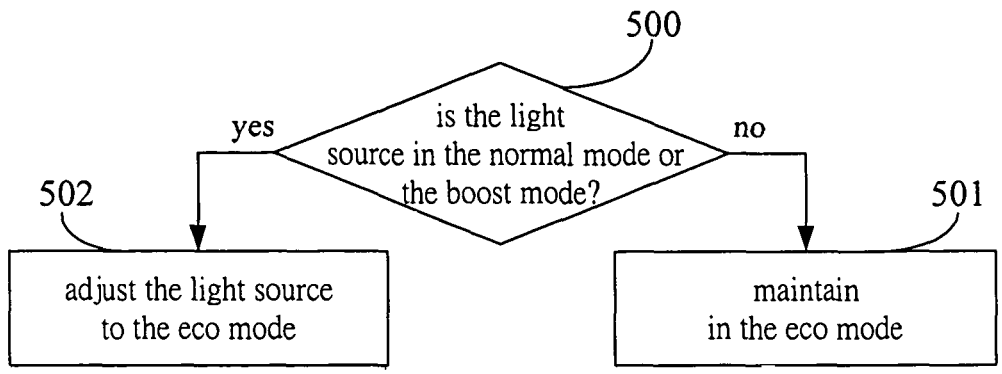
FIG. 5 is a flow chart showing the steps for adjusting the light source to the eco mode.

Step 402 may further comprise the steps shown in FIG. 5. In step 500, determining whether the light source is in the normal mode or the boost mode is executed. If not, it means that the light source is already in the eco mode so step 501 is executed in which the light source maintains in the eco mode. If yes, step 502 is executed to adjust the light source to the eco mode.

Figure 6:
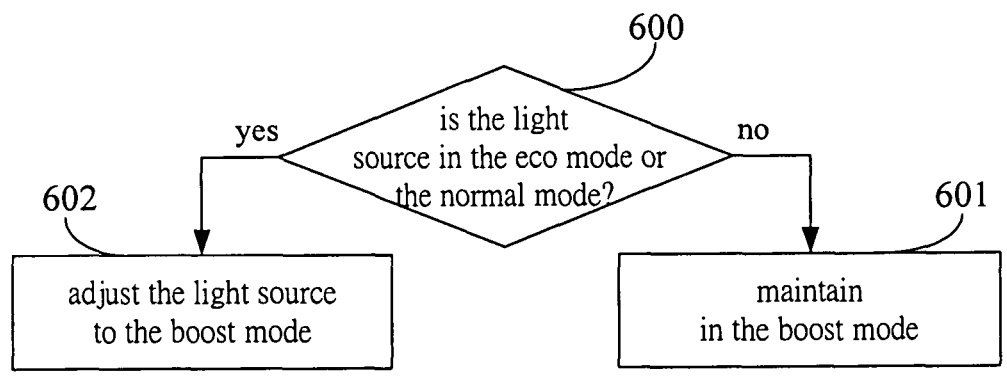
FIG. 6 is a flow chart showing the steps for adjusting the light source to the boost mode.

Step 404 may further comprise the steps shown in FIG. 6. In step 600, determining whether the light source is in one of the eco mode and the normal mode is executed. If not, it means that the light source is already in the boost mode so step 601 is executed in which the light source maintains in the boost mode. If yes, step 602 is executed to adjust the light source to the boost mode.

The light source can be adjusted by N stages in steps 407, 502, and 602, wherein N is a positive integer. More specifically, in step 407, the light source is adjusted from the eco mode or the boost mode to the normal mode by N stages. In step 502, the light source is adjusted from the normal mode or the boost mode to the eco mode by N stages. In step 602, the light source is adjusted from the eco mode or the normal mode to the boost mode by N stages. Because human eyes are unable to sense the adjustment of the lighting modes, eye discomfort due to sudden brightness difference is avoided. Accordingly, a smooth adjustment of brightness is achieved.

The second embodiment may further comprise a step to select one of the image characteristic curves as FIG. 2 shows. For example, users may manually select one of the image characteristic curves via an OSD menu to decide the characteristic curve to display an image.

Although step 401 is executed prior to step 403, the present invention does not limit the order of the two steps. In other words, step 403 can be executed prior to step 401. Such modification does not influence the implementation of the present invention.

While above embodiments and individual features of the present invention have been illustrated and described, it would be obvious to those skilled in the art that various changes and modifications can be made without departing from the spirit and scope of the present invention as defined by the claims appended hereto.

What is claimed is:

1. An apparatus for dynamically enhancing image contrast, comprising:
   a front-end processing circuit for receiving a plurality of image signals and selecting one of the plurality of image signals to generate an image data after processing, the image data comprising a brightness of an image;
   a light source comprising an eco mode, a normal mode, and a boost mode;
   an image data buffer for temporarily storing the image data; and
   a micro-processor presetting a black threshold and a white threshold, the micro-processor dynamically adjusting the light source to the eco mode by decreasing an illumination level of the light source as the micro-processor determines that the brightness of the image in the image data from the image data buffer is lower than the black threshold, and the micro-processor dynamically adjusting the light source to the boost mode by increasing the illumination level of the light source as the micro-processor determines the brightness of the image in the image data from the image data buffer is higher than the white threshold;

wherein the micro-processor is configured to perform the steps of presetting the black threshold and the white threshold, dynamically adjusting the light source, and determining the brightness of the image, without intervention from a user;

wherein the micro-processor adjusts the light source from one of the normal mode and the boost mode to the eco mode by N stages when the light source is in one of the normal mode and the boost mode, N is a positive integer greater than 1, and the brightness of the image is a mean brightness of the image.

2. The apparatus of claim 1, wherein the micro-processor adjusts the light source from one of the eco mode and the normal mode to the boost mode by the N stages when the light source is in one of the eco mode and the normal mode.

3. The apparatus of claim 1, wherein the micro-processor selects one of a plurality of image characteristic curves to adjust an illumination characteristic curve of the eco mode, the normal mode, and the boost mode.

4. The apparatus of claim 3, wherein the plurality of image characteristic curves comprise a PC image characteristic curve, a MAC image characteristic curve, a VIDEO image characteristic curve, a CHART image characteristic curve, and a B&W image characteristic curve.

5. The apparatus of claim 3, further comprising an OSD (on-screen display) menu, wherein a user manually selects one of the plurality of image characteristic curves through the OSD menu.

6. The apparatus of claim 1, wherein the apparatus is a projection device.

7. The apparatus of claim 6, further comprising:
an optical projection unit for converting the image data to the image;
wherein the light source projects the image onto a screen.

8. The apparatus of claim 1, wherein the apparatus is a flat panel display device.

9. A method for dynamically enhancing a contrast of an image, the contrast being determined by a light source comprising an eco mode, a normal mode and a boost mode, the method comprising the steps of:
(a) receiving a plurality of image signals and selecting one of the plurality of image signals to generate an image data after processing, the image data comprising a brightness of an image;
(b) storing the image data in an image data buffer temporarily;
(c) determining whether the brightness of the image in the image data from the image data buffer is lower than a black threshold, if yes, going to step (d);
(d) dynamically adjusting the light source to the eco mode by decreasing an illumination level of the light source;
(e) determining whether the brightness of the image in the image data from the image data buffer is higher than a white threshold, if yes, going to step (f); and
(f) dynamically adjusting the light source to the boost mode by increasing the illumination level of the light source;
wherein step (d) further comprises the steps of:
(g) determining whether the light source is in one of the normal mode and the boost mode, if yes, going to step (h),
(h) adjusting the light source from one of the normal mode and the boost mode to the eco mode by N stages; and
wherein N is a positive integer greater than 1, the brightness of the image is a mean brightness of the image, and steps (a)-(h) are performed automatically, without intervention from a user.

10. The method of claim 9, wherein step (f) further comprises the steps of:
(i) determining whether the light source is in one of the eco mode and the normal mode, if yes, going to step (j); and
(j) adjusting the light source from one of the eco mode and the normal mode to the boost mode by the N stages.

11. The method of claim 9, wherein
if the brightness of the image is determined not lower than the black threshold in step (c) and the brightness of the image is determined not higher than the white threshold in step (e), the method further comprises the steps of
(k) determining whether the light source is in the normal mode, if not, going to step (l); and
(l) adjusting the light source from one of the eco mode and the boost mode to the normal mode by the N stages.

12. The method of claim 9, further comprising:
(m) selecting one of a plurality of image characteristic curves.

13. The method of claim 12, wherein step (m) is that a user manually selects one of the plurality of image characteristic curves through an OSD menu.

* * * * *